April 25, 1967 C. H. COKER 3,316,419
MAGNETIC CORE COMMUTATOR
Filed Sept. 26, 1962 2 Sheets-Sheet 1

INVENTOR
C. H. COKER
BY
G. E. Hirsch Jr.
ATTORNEY

INVENTOR
C. H. COKER
BY
ATTORNEY 3,316,419
Patented Apr. 25, 1967

3,316,419

MAGNETIC CORE COMMUTATOR

Cecil H. Coker, Berkeley Heights, N.J., assignor to Bell Telephone Laboratories, Incorporated, New York, N.Y., a corporation of New York Filed Sept. 26, 1962, Ser. No. 226,379
6 Claims. (Cl. 307—88)

This invention relates to apparatus for the sequential activation of crosspoint gates in a commutator or the like and more particularly to apparatus of this sort that employs a saturable core line as its basic driving mechanism.

Commutator apparatus is widely used for arranging a number of simultaneously available signals in a desired order on the time scale. For example, each of the available signals may be sampled in a prescribed order and the resulting brief samples delivered sequentially to a common output channel. In practice, this is often done by means of diode or transistor crosspoint switches connected in matrix-like fashion and actuated by energy delivered directly to the devices. Direct coupling has two disadvantages, however; namely, the drive circuit impedance loads the signal source, and the drive current for each crosspoint switch must be returned through the signal and output circuits or be compensated by opposing currents applied at other points on the crosspoint circuit. If the commutator is to be used with high impedance signal sources, these difficulties may be overcome, but generally only with considerable circuit complexity. In an effort to avoid the loading and drive current problems transformers are thus sometimes used to isolate the crosspoint drive circuits from the signal and output leads. Individual transformers and individual transformer driver circuits must be provided, in addition to the usual control logic elements. This procedure is thus feasible only in systems where a few signals are to be commutated, but when extended to commutators with a multiplicity of inputs, such a procedure is complex, space consuming, and consequently generally impractical.

These difficulties are overcome in the present invention by utilizing, as an active element in each crosspoint switch of a matrix, one winding of a saturable magnetic core. The individual windings associated with the various switches are individually and independently actuated in sequence as the corresponding magnetic cores reach a saturated condition. They do so sequentially and with a controllable periodicity by virtue of the delay associated with each core as it saturates and the network coupling the cores. In accordance with the invention, the driving windings of the cores associated with each of the crosspoint elements are connected in series, and the magnetic cores with the serially connected energizing windings are coupled to form a magnetic delay line. By suitably interconnecting the sections of the driving line, the several cores of the line become saturated at prescribed intervals. Propagation of a potential "wave front" down the line is at a rate dependent on the magnitude of the driving potential; i.e., delay per section is a function of core saturation and the time required for saturation, in turn, is a function of the magnitude of the driving potential. So that further economies may be realized, it is in accordance with the invention to propagate a wave front repetitively through the line in opposite directions. As soon as the last magnetic core in the line is saturated, a suitable energizing signal is generated and propagated back down the line to the initial energized end of the line where, unless stopped, a new potential is generated for repropagation down the line. Once energized, the line is thus self-propagating in a reciprocal fashion. Selected crosspoint switches are actuated during propagation in each direction. If it is desired at any time to skip a particular crosspoint switch, it may be done merely by by-passing the energizing winding of the core associated with that switch.

In practice, a number of isolated windings are actuated as each core switches in turn from saturation in one direction to saturation in the other. The windings are used individually to control crosspoint switches. Complete isolation is thereby assured for each switch section as propagation takes place in alternate directions. Polarities of the gate control windings are such that selected gates only are switched on by a given core with propagation in one direction and other selected gates are switched on with propagation in the other.

The invention will be more fully apprehended from the following detailed description of illustrative embodiments thereof taken in connection with the appended drawings, in which.

Figure 1:
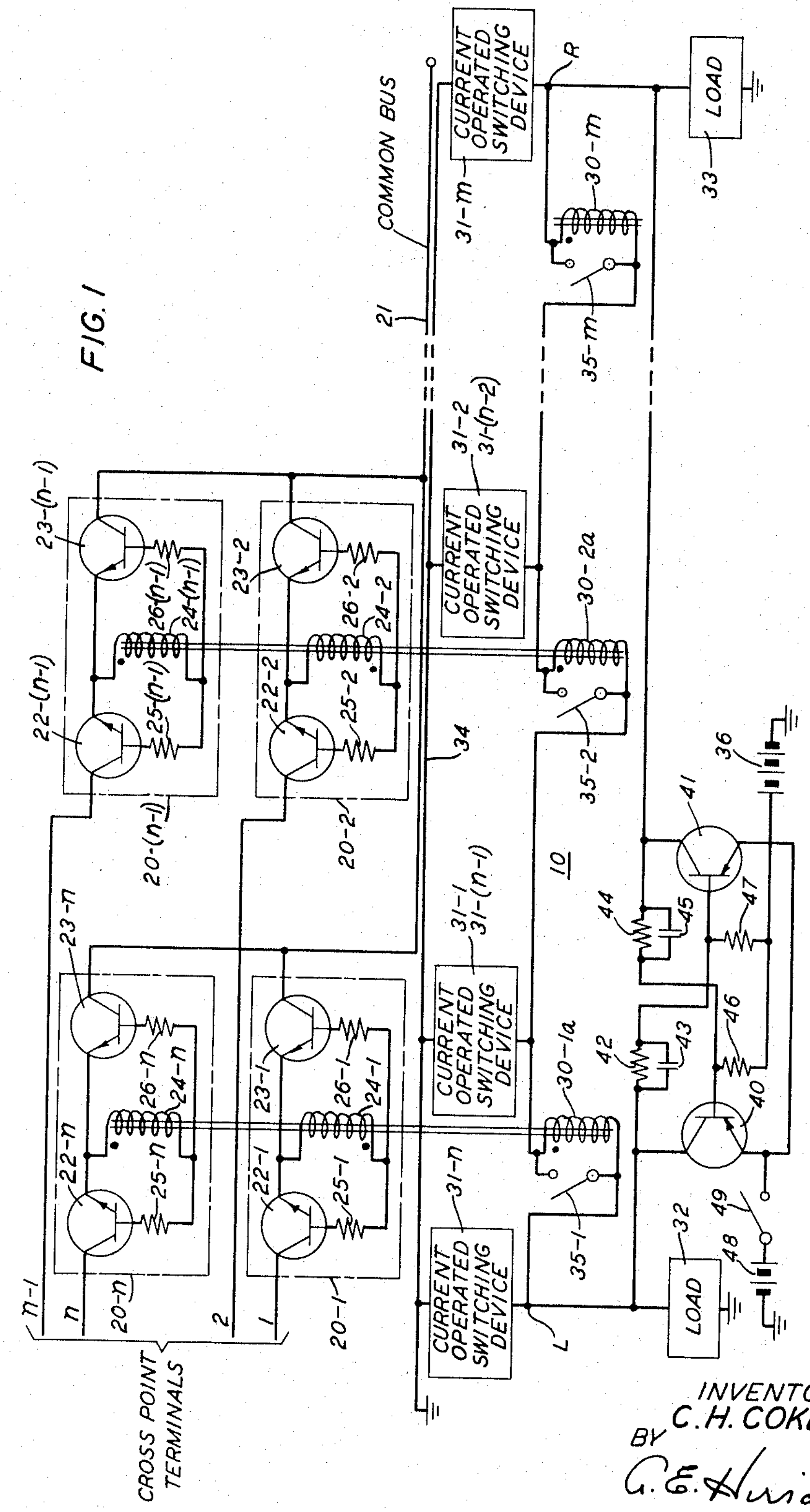
FIG. 1 is a schematic drawing of a crosspoint commutator which illustrates the principles of the invention.

FIG. 1 illustrates a crosspoint commutator which includes a number of crosspoint gates 20–1 . . . **20–*n* interconnected to deliver signals supplied to the gates by way of independent crosspoint terminals 1, 2**, . . . *n* in a prescribed temporal order to a single common bus 21. The crosspoint gates are all preferably identical in construction. Each includes a pair of transistors 22 and 23, and a control winding 24 associated with one of the magnetic core sections of delay line 10. Input signals are supplied, respectively, in the illustrative embodiment shown, to the collectors of transistors 22, and the collectors of transistors 23 are connected together to common bus 21. The emitters of the two transistors of each gate are directly coupled and the bases are connected together via resistors 25 and 26. If desired, the collector and emitter connections may be interchanged; the connection shown requires somewhat less driving power but yields a slightly higher voltage drop across the collector-emitter junction. The two transistors of each gate are normally biased such that at least one has a high impedance thus to block signal passage from the input terminal to bus 21. Which of the two fails to conduct depends on the relative potentials on the collectors and emitters of the two transistors; the one whose collector is biased negative relative to its emitter and base does not conduct and is an open circuit.

Ordinarily, control winding 24 constitutes substantially a short circuit between emitters and bases of both transistors. When the delay line core on which it is wound is energized and driven from saturation in one direction toward saturation in the other, however, a voltage is induced in the winding with the proper polarity to permit forward current flow in both transistors. During the period of induced voltage, therefore, the signal which appears on crosspoint terminal 1, for example, is coupled via the collector-emitter paths of transistors 22–1 and 23–1 of gate 20–1 to common bus 21. At the cessation of the induced voltage in the winding, forward current flow in the two transistors ceases and an open circuit condition once again is established. By suitably arranging the control winding of each switch associated with each core of the delay line, e.g., 24–1 . . . **24–*n*, according to the polarity of induced voltage with saturation reversal, selected ones only of the switches are actuated as core saturation is switched in each direction. The dot notations adjacent the windings 24 indicate polarity as compared with the polarity of the corresponding energizing windings connected in delay line 10**.

Magnetic core delay line 10 comprises a ladder configuration of saturable core reactors as the series elements and current operated switching devices as the shunt elements. Each of the saturable core reactors includes a magnetic element characterized by a substantially square loop saturation characteristic, a magnetizing winding 30, and several control windings 24. The magnetizing windings 30 are connected in series.

Current operated switching devices 31 connected in the shunt arms of delay line 10 normaly exhibit a low impedance and can be considered essentially short circuits. With sufficient current flow, however, each device shifts from its low impedance, short circuit, state to a relatively high impedance state, and acts as an open circuit. Current flow through the energizing winding of the core reactors, for example, as a result of a potential applied at point L, is returned to ground via one of the current operated switches. With sufficient current, each switch opens in turn, after which the next current operated switching device in the delay line acts as the current return path. After saturation, the device remains in its open state until the voltage across it drops below a critical value. It then reverts once again to its low impedance state.

Figure 2:
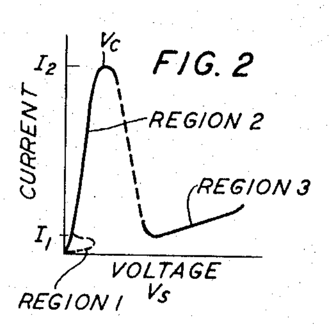
FIG. 2 is a diagram of a preferred characteristic for the current sensitive switching means employed in the apparatus of FIG. 1.

It will be observe that the essential requirements of the current operated switching devices 31 are met by a circuit or device which exhibits a voltage-current characteristic of the sort illustrated in FIG. 2 which is characterized by a negative impedance region. A device with this characteristic passes a considerable current at a low applied voltage above a critical value of current $I_1$. It thus exhibits a low impedance and acts essentially as a short circuit (region 2 in the figure). When current exceeds a maximum value $I_2$ and a critical voltage $V_C$ is exceeded, operation takes place in an unstable region until, with sufficient voltage, another stable region (region 3) is reached which is characterized by relatively low current flow for subsequent increases in voltage. This is characteristic of a high impedance device and an open circuit. Although a solid state device such as a tunnel diode is suitable for use in the switching circuit, the required negative resistance characteristic may be achieved in a number of other ways, some of which are illustrated in FIGS. 3 through 6 and will be described hereinafter. Region 1 in FIG. 2 is common to some of them and its influence will be described below. Since a square loop core in the process of being driven from one saturation condition to an opposite one can best be described as a current limiting device, the current operated switching device, whatever its form, is adjusted such that its critical current $I_2$ is above the current limit set by the unsaturated core. When the core reaches saturation, it assumes a characteristic best described as a short circuit. It therefore allows current to reach the value $I_2$ and open the switching device. The next core in the cascade is not saturated in the direction of new current, however, and so again current is limited and the switching device associated with that core remains in a closed condition, i.e., does not open, until the core saturates.

With all cores of the line 10 set to saturation for the same direction of current, all of the switching devices 31 exhibit a low impedance and are thus essentially short circuits. A voltage applied at one end of the line, for example, across load 32 at point L urges sufficient current through switch 31–$n$ to open it; to transform it to a high impedance. The next available current path is via winding 30–1*a* and switch 31–1, and sufficient current flows in this path to drive the core associated with winding 30–1*a* to saturation in the opposite direction. When the core reaches saturation it ceases to impede current flow so that current increases to the value $I_2$, actuates switching device 31–1, and shifts it from a short circuit condition to an open circuit. The induced voltage in winding 30–1*a* is thereafter zero and the core is immune to the effect of the potential appearing at point L. Switch 31–1 remains in its high impedance state as a result of the continued presence of the potential at point L. Winding 30–2 of the next succeeding core is not so immune however, being in the oppositely saturated condition. It then reacts to the driving potential and begins to saturate. As saturation occurs, sufficient current flows through winding 30–2*a* and switch 31–2, to actuate the switch. When actuated, it allows the driving voltage to appear across the next core-switch pair. This stepping action continues, with a considerable delay between successive core saturation reversals, until core device 30–$m$ is saturated and current operated switching device 31–$m$ switches to its open circuit state.

In effect, an applied wave front proceeds down the line by saturating cores in sequence, leaving preceding ones saturated and succeeding ones undisturbed. Delay per section is a function of the magnitude of the potential applied to the line, core saturation flux, and the number of turns on the energizing windings of the cores. Hence, the wave front is propagated with a delay per section that is inversely proportional to the voltage applied at point L; i.e., the velocity of propagation is proportional to the applied voltage.

As the cores sequentially saturate, those control windings 24 that are properly poled, e.g., those associated with switches 20–1, 20–2, . . . 20–$m$ in the figure, are momentarily energized and transistors 22 and 23 associated with the switches are forward biased so that a direct connection is temporarily made between the respective crosspoint terminals and common bus 21. In effect, the signals supplied to terminals 1 through $m$ are sampled and applied in order to the common bus. Although a voltage is similarly induced in the control windings 24–($n-m$) . . . 24–($n$), associated with switches 20–($n-m$) . . . 20–($n$), the polarity of the voltage is reversed, and the switches remain open.

Ordinarily, operation would terminate as soon as all cores become saturated, and resetting would be required before the line could again be energized in the same direction. As an alternative, manual means for initiating propagation of a driving potential down the line in a reverse direction might be provided. In accordance with the present invention, reverse propagation is secured automatically. This obviates the necessity for core resetting, and, by virtue of the crosspoint switch construction, permits continuous operation. As soon as current operated switch 31–$m$ is actuated, all of the cores of the line are saturated in the same direction and the potential of point L is equal to that across load 33, i.e., to the potential of point R at the other end of the line. When this condition obtains, the driving potential across load 32 at point L is removed (and with it the potential across load 33 at point R), all of curent operated switching device 31 revert to their low impedance condition, and a new driving potential is applied to point R.

Automatic drive reversal is provided by a transistor switch configuration that resembles a multivibrator. The reversing switch comprises transistors 40 and 41 interconnected, collector-to-base, by coupling circuits which include the parallel combination of resistor 42 and capacitor 43, and resistor 44 and capacitor 45, respectively. The bases are coupled by way of resistors 46 and 47 to a positive bias potential source 36, and the emitters are tied together and to the positive terminal of a potential source, for example, battery 48, by way of switch 49. The negative terminal of battery 48 is designated ground and hence constitutes the return path for current operated switching devices 31 via bus 34, and loads 32 and 33. With this configuration, one transistor is normally conducting, and the other normally nonconducting. Point L is tied to the collector of transistor 40, and point R is tied to the collector of transistor 41. It is apparent, therefore, that if transistor 40 conducts, the positive potential of battery 48 is connected by way of its emitter-collector path to point L, and if transistor 41 conducts, battery potential is connected to point R.

In the discussion above, it was assumed that transistor 40 was conducting and transistor 41 nonconducting yielding propagation from L to R. When all cores have become saturated in the same direction due to the potential at point L, however, and point L and point R are effectively tied together, drive disappears from the base of transistor 40. As a result, both collectors start to go negative, and consequently, the bases do also. Because of the charge on capacitor 45, however, the base of transistor 41 reaches the conduction level before that of transistor 40 does, and transistor 41 conducts. When it does, it holds transistor 40 in the nonconducting state, and couples battery 48 to load 33 and point R. The potential is of the correct polarity to propagate down the line from point R to point L and to reverse the polarity of saturation of the core devices of the line. Switching device 31–*m* immediately is actuated (becomes a high bridging impedance) and core device 30–*m* begins to saturate in a reverse direction. Until saturation occurs, associated current operated switch 31–(*n*—*m*) operates to decouple the oncoming wave front from all other cores in the line via the delay period associated with the core device. Preferably, the current operated switches are bidirectional devices, and hence the same ones that were used for L-R propagation are used for R-L propagation. Dual designations are used in the figure as required.

As soon as the wave front has progressed to the end of the line and reaches point L, drive is removed from transistor 41 and the flip-flop action of the reversal circuit immediately turns transistor 40 on and transistor 41 off. The current operated switches are automatically reset and a new wave immediately commences at point L to propagate down the line towards point R. Continuous operation of this sort is initiated merely by closing switch 49 to apply positive potential from battery 48 to the emitters of the reversing circuit transistors. Termination of operation may be achieved by opening the switch and, by virtue of the remanence of the magnetic cores of the delay line, operation can be continued from the point at which it was terminated, merely by reenergizing the circuit with the same driving force. Any desired means may be used with this mode of operation to insure that the proper transistor, 40 or 41, resumes conducting when the line is again energized.

As indicated above, selected switches 20 are actuated during propagation from left to right and other selected switches are actuated during propagation from right to left by virtue of the polarity of control windings 24. Individual commutator switches may, if desired, be removed from the scanning itinerary merely by withholding excitation of the magnetizing winding 30 of the core, and hence, of the control winding 24 of the switch in question. Since a saturated core approximates a short circuit, the action of a delay section can be removed by shorting the primary winding, for example, by closing switch 35. With the crosspoint switch arrangement illustrated in FIG. 1, both switches associated with the particular core will be inoperative during continued cycling. It is possible to remove a core from operation during propagation in the left to right direction, for example, and to restore it to operation in the right to left condition. This requires that provision be made for saturating the core in the same direction as the others of the line prior to the left to right cycle. Otherwise, it would be in the same state of magnetization as the other cores "behind" the wave front and would be skipped over again.

Figure 3:
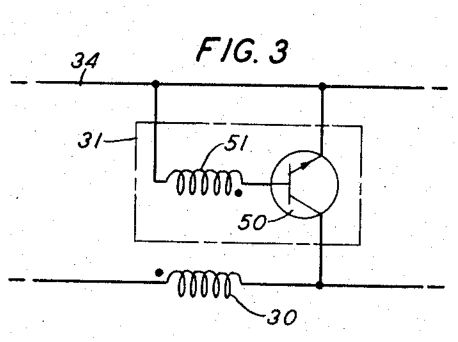
FIG. 3 is a schematic diagram of one suitable form of current sensitive switching device for use in the practice of the invention.

Current operated switching devices 31 may take any one of a number of forms. Each is characterized by a first normally low impedance state which changes to a second normally high impedance with an intervening negative impedance region if current through the device exceeds a threshold. As indicated previously, a tunnel diode has the requisite characteristic. FIG. 3 illustrates a suitable switching network which employs positive feedback control. It includes transistor 50 and an auxiliary control winding 51 wound on a core with magnetizing winding 30. The emitter and base of transistor 50 are connected to a negative potential via ground bus 34 and the collector is connected to a positive potential via the magnetizing winding 30 of the delay line and one or the other of transistor switches 40 or 41. Ordinarily, a switch of this construction exhibits a normally high impedance (region 1) for currents below a critical value, designated $I_1$ in FIG. 2. However, by use of a suitable load, e.g., 33 in FIG. 1 at the end of the delay line remote from the driving end, e.g., L, sufficient current is drawn through each primary winding 30 of the core devices to bias the associated switches above $I_1$ into a low impedance region, namely, region 2. Assuming sufficient load current to overcome the effect of region 1 of the characteristic curve, transistor 50 will be biased to conduction as soon as voltage is applied to the magnetizing winding 30, and its collector-emitter path will represent essentially a short circuit. As the core proceeds toward saturation, with the propagation of a signal through primary winding 30, a voltage is induced in winding 51. By virtue of its configuration on the core, it is of the proper polarity to develop a positive potential at the base of transistor 50, thus keeping it on until saturation is reached. The switch is then in a high impedance state, e.g., the switch is open. Following the delay interval required for saturation of the core, the base is again effectively connected to negative bus 34 and the transistor is once again biased out of conduction and the switch resembles an open circuit so that the propagated voltage is applied to the next section.

Figure 4:
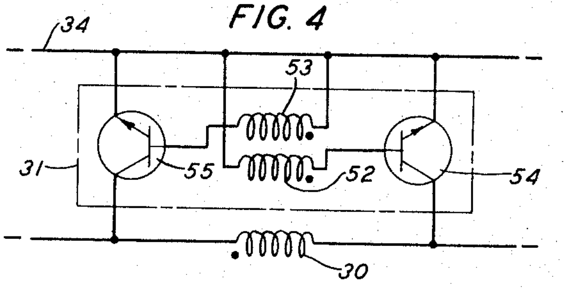
FIGS. 4, 5, and 6 are schematic diagrams of alternative forms of current sensitive switching devices useful in the practice of the invention.

For operation during propagation in the reverse direction, the voltage induced in the auxiliary winding 51 would, with the polarities associated with transistor 50, prevent conduction of the transistor. Accordingly, it is necessary to reverse the polarity of the auxiliary core winding so that once again a positive potential is supplied to the base of the transistor. FIG. 4 illustrates a suitable arrangement wherein a pair of auxiliary coils 52 and 53 are employed connected respectively to transistor switches 54 and 55. With propagation of a driving impulse from left to right through winding 30, a positive potential is induced at the base end of winding 52 so that transistor 54 is momentarily switched to its low impedance state, i.e., it is temporarily made to conduct. The potential induced in winding 53, however, is of a polarity to hold transistor 55 in its nonconducting, high impedance state. With reverse propagation through winding 30, the potential induced in winding 53 is, however, of the proper polarity to render transistor 55 conducting during the saturating cycle of the coil and to hold transistor 54 in its normal nonconducting, high impedance state.

Figure 5:
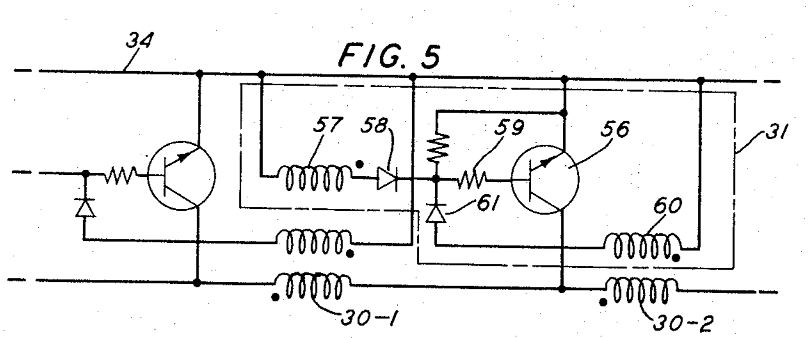

Bidirectional operation of this sort may be achieved with the apparatus of FIG. 5 by employing diodes in the auxiliary winding connections to isolate them from one another and to permit the transistor switches to operate during propagation in both directions. For example, transistor switch 56 is switched to its conducting state by a voltage induced in winding 57 during the process of saturating the magnetic core supporting winding 30–1, during propagation from left to right. The induced voltage is passed by way of diode 58 and resistor 59 to the base of transistor 56. Auxiliary winding 60 associated with energizing winding 30–2 is connected via diode 61 and resistor 59 to the base of transistor 56. Since winding 30–2 is not activated, the negative potential of bus 34 reverse biases diode 61 so that winding 60 does not alter the operation of transistor 56. As core device 30–2 is subsequently saturated, the voltage induced in auxiliary winding 60 continues the reverse bias condition of diode 61. For propagation in the reverse direction, auxiliary winding 60 develops a positive potential at the anode terminal of diode 61, thus to forward bias it and permit a positive potential to appear at the base of transistor 56. As core device 30–1 is subsequently saturated, the voltage induced in auxiliary winding 57 continues the reverse bias condition of diode 58 so that it is ineffectual to control the operation of transistor 56. With this arrangement, transistor switch 56 is used both in the forward and reverse propagating directions to provide an alternate low impedance-high impedance shunt to bus 34 for core devices 30–1 and 30–2, respectively.

Figure 6:
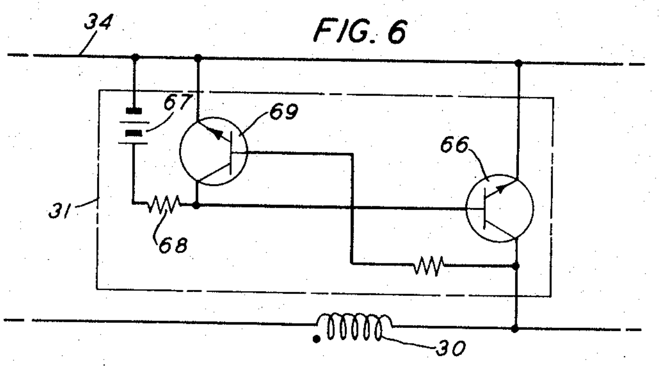

A transistor network of the sort illustrated in FIG. 6 possesses the requisite characteristic for use as a current operated switch. In the network, transistor 66 connected between one terminal of winding 30 of the delay line structure and negative bus 34 is biased by way of battery 67 and resistor 68 so that it normally presents a low voltage drop to currents below a selected critical value. It therefore exhibits the required low impedance condition. Similarly, transistor 69 is normally biased to its nonconducting state so long as the voltage across transistor 66 is low. Transistor 66, during conduction, exhibits a relatively low voltage from emitter to collector. However, when current exceeds a value proportional to its base current, a sizable voltage is developed across its emitter-collector junction which immediately causes transistor 69 to conduct and short circuit the drive applied between base and emitter of transistor 66. Consequently, transistor 66 reverts to its nonconducting, high impedance state. It remains latched in this nonconducting condition until the load current flowing, mainly through the base of transistor 69, is reduced substantially. Consequently, with transistor 66 in its normal conducting condition, disappearance of the potential developed in winding 30 allows sufficient current to pass through transistor 66 to cause the switching action described above.

It will be recognized, of course, that the designation of the multiplicity of crosspoint terminals as inputs and the common bus as output in the exemplary embodiment of FIG. 1 is merely illustrative of the application of the principles of the invention. As shown, a plurality of input signals are sequentially supplied to a common bus. Reverse operation is, of course, possible with the same circuit and without alteration. Furthermore, a variety of specialized switching actions may be obtained by suitably programming the crosspoint switches. Such variations as well as others will readily occur to those skilled in the art.

What is claimed is:

1. A pulse generator system comprising, in combination, a plurality of sections each including a core of magnetic material, an input winding and a number of output windings in circuit relation with each one of said cores, said input windings of said sections being connected in cascade, and a number of current responsive switching elements shunting said sections, means for propagating a signal through the cascaded input windings of said sections, means responsive to the arrival of said signal at the last of said sections for initiating a signal for propagation in the reverse direction through the input windings of said sections, a plurality of gate circuits, and means associated with each one of said gate circuits for actuating it independently of all other of said gates, said means including one of the output windings associated with a selected one of said cores.

2. A commutator system comprising a plurality of sections each including a core of magnetic material, an input winding and a number of output windings in circuit relation with each one of said cores, said input windings of said sections being connected in cascade, and a switching element shunting each one of said sections, means for propagating a signal through the cascaded input windings of said sections, means responsive to the arrival of said signal at the last of said sections for initiating a signal for propagation in the reverse direction through the input windings of said sections, a plurality of gate circuits, means associated with each one of said gate circuits for actuating it independently of all other of said gates, said means including one of the output windings associated with a selected one of said cores, means for supplying a signal to one signal terminal of each of said gate circuits, means for connecting the other signal terminal of each of said gate circuits to a common bus, and means associated with each of said gates for passing the signal supplied to one terminal to the other terminal whenever a voltage is induced in said output winding.

3. A commutator system as defined in claim 2 wherein each of said switching elements comprises, a current operated switching device characterized by high current and low impedance for applied voltages thereacross below a selected critical voltage, and by a relatively low current and high impedance for applied voltages thereacross above said selected critical voltage.

4. A commutator comprising a plurality of sections each including a core of magnetic material, an input winding and a number of output windings in circuit relation with each one of said cores, said input windings of said sections being connected in cascade, and a current operated switching element shunting each one of said sections, means for selectively propagating a signal through the cascaded input windings of said sections in either direction, means responsive to the arrival of said signal at the last of said sections following propagation of a signal therethrough in either direction for initiating a signal for propagation in the reverse direction through the input windings of said sections, a plurality of gate circuits, and means associated with each one of said gate circuits for actuating it with signal propagation through said cascaded input windings in one selected direction only, said means including one of the output windings associated with a selected one of said cores.

5. In combination: a plurality of magnetic cores; an energizing winding and a number of output windings in circuit relation with each of said cores; means for connecting said energizing windings in cascade; a current responsive bistable element connected between each of said cores and a reference potential point; means including potential means and said current responsive elements for sequentially driving each of said cores from magnetic flux saturation in a first direction to magnetic flux saturation in a second, opposite, direction; means responsive to the reversal of magnetic flux saturation of the last of the cores in said cascade connection for sequentially driving each of said cores from saturation in said second direction to saturation in said first direction, said last-named means comprising first voltage sensitive switching means shunting said current responsive element which connects the output of the energizing winding of said last core to said reference potential point, second voltage sensitive switching means shunting said current responsive element which connects the input of the energizing winding of said first core to said reference potential point, potential means, and means in circuit relation with said first and said second voltage sensitive switching means for actuating said switches to connect said potential means to the energizing winding of said last core upon the reversal of magnetic flux saturation in said last core in a first selected direction and to connect said potential means to the energizing winding of said first core upon a reversal of magnetic flux saturation of said first core in a second selected direction; a plurality of gate circuits; and means associated with each one of said gate circuits including one of said output windings for actuating it independently of all other of said gates as the magnetic flux saturation of said associated core is reversed.

6. In combination: a plurality of magnetic cores; an energizing winding and a number of output windings in circuit relation with each one of said cores; means for connecting said energizing windings in cascade; a current responsive bistable element connected between each one of said cores and a reference potential point, each of said current responsive bistable elements comprising a network which includes a nonlinear element characterized by a low impedance region, a high impedance region, and an intervening negative impedance region, and one of said output windings associated with one of said cores for transferring said nonlinear element from its low impedance region to its high impedance region in the presence of an induced voltage of a selected polarity in said winding and for transferring said nonlinear element from its high impedance region to its low impedance region upon cessation of said induced voltage in said winding; means including potential means and said current responsive elements for sequentially driving each of said cores from magnetic flux saturation in a first direction to magnetic flux saturation in a second, opposite, direction; means responsive to the reversal of magnetic flux saturation of the last of the cores in said cascade connection for actuating means including potential means and said current responsive elements for sequentially driving each of said cores from saturation in said second direction to saturation in said first direction; a plurality of gate circuits; and means associated with each one of said gate circuits including one of said output windings for actuating it independently of all other of said gates as the magnetic flux saturation of said associated core is reversed.

References Cited by the Examiner

UNITED STATES PATENTS

| | | | |
|---|---|---|---|
| 2,955,264 | 10/1960 | Kihn | 340—174 |
| 3,018,389 | 1/1962 | Herscher | 340—174 |
| 3,061,740 | 10/1962 | Markowitz | 307—88 |
| 3,117,234 | 1/1964 | Hubbard | 307—88 |
| 3,125,747 | 3/1964 | Bennion | 340—174 |
| 3,241,129 | 3/1966 | Smith | 340—174 |

BERNARD KONICK, *Primary Examiner.*

M. S. GITTES, *Assistant Examiner.*